United States Patent [19]
Slicker et al.

[11] Patent Number: 5,630,773
[45] Date of Patent: May 20, 1997

[54] METHOD AND APPARATUS FOR SLIP MODE CONTROL OF AUTOMATIC CLUTCH

[75] Inventors: James M. Slicker, West Bloomfield, Mich.; Kwok W. Chan, Lancashire, United Kingdom

[73] Assignee: Eaton Corporation, Cleveland, Ohio

[21] Appl. No.: 597,573

[22] Filed: Feb. 2, 1996

[51] Int. Cl.$^6$ ............................................ B60K 41/02
[52] U.S. Cl. ......................... 477/176; 477/175; 477/180
[58] Field of Search ................................... 477/166, 174, 477/175, 176, 180

[56] References Cited

U.S. PATENT DOCUMENTS

| | | | |
|---|---|---|---|
| 5,275,267 | 1/1994 | Slicker | 477/176 |
| 5,314,050 | 5/1994 | Slicker et al. | 477/175 X |
| 5,378,211 | 1/1995 | Slicker et al. | 477/175 |
| 5,403,249 | 4/1995 | Slicker | 477/176 |
| 5,403,250 | 4/1995 | Juergens | 477/176 |
| 5,439,428 | 8/1995 | Slicker | 477/175 |
| 5,484,354 | 1/1996 | Vukovich et al. | 477/174 |
| 5,499,954 | 3/1996 | Wagner et al. | 477/174 |
| 5,569,117 | 10/1996 | Kono et al. | 477/169 |

*Primary Examiner*—Charles A. Marmor
*Assistant Examiner*—Peter T. Kwon
*Attorney, Agent, or Firm*—Young & Basile, P.C.

[57] ABSTRACT

An automatic clutch controller for a vehicle that reduces the oscillatory response to clutch engagement. The automatic clutch controller receives inputs from a throttle position sensor, an engine speed sensor and a transmission input speed sensor and develops a clutch actuation signal controlling a clutch actuator from disengaged to fully engaged. The clutch engagement signal at least partially engages the friction clutch in a manner to cause the measured transmission input speed to asymptotically approach engine speed employing an approximate inverse model of this oscillatory response. The automatic clutch controller develops a slip reference signal as a function of throttle position and engine speed and compares it to actual slip. The controller includes a PID regulator responsive to the difference of slip and slip reference, a prefilter operating on the resulting PID signal, and a compensator constructed to reduce the need for detailed particularization for individual vehicles or vehicle models by reducing the system closed loop sensitivity to vehicle parameter variations.

15 Claims, 3 Drawing Sheets

METHOD AND APPARATUS FOR SLIP MODE CONTROL OF AUTOMATIC CLUTCH

This invention relates to automatic clutch controls, and more particularly closed loop automatic clutch control and method for reducing oscillatory response to launch of a motor vehicle.

BACKGROUND OF THE INVENTION

In recent years there has been a growing interest in increased automation in the control of the drive train of motor vehicles, and most especially in control of the drive train of large trucks. The use of automatic transmissions in passenger automobiles and light trucks is well known, The typical automatic transmission in such a vehicle employs a fluid torque converter and hydraulically actuated gears for selecting the final drive ratio between the engine shaft and the drive wheels. This gear selection is based upon engine speed, vehicle speed and the like. It is well known that such automatic transmissions reduce the effectiveness of the transmission of power from the engine to the drive shaft, with the consummate reduction in fuel economy and power as compared with the skilled operation of a manual transmission. Such hydraulic automatic transmissions have not achieved wide spread use in large motor trucks because of the reduction in efficiency of the operation of the vehicle.

One of the reasons for the loss of efficiency when employing a hydraulic automatic transmission is loss occurring in the fluid torque converter. A typical fluid torque converter exhibits slippage and consequent loss of torque and power in all modes. It is known in the art to provide lockup torque converters that provide a direct link between the input shaft and the output shaft of the transmission above certain engine speeds. This technique provides adequate torque transfer efficiency when engaged, however, this technique provides no gain in efficiency at lower speeds.

It has been proposed to eliminate the inefficiencies inherent in a hydraulic torque converter by substitution of an automatically actuated friction clutch. This substitution introduces another problem not exhibited in the use of the hydraulic torque converters. The mechanical drive train of a motor vehicle typically exhibits considerable torsional compliance in the driveline between the transmission and the traction wheels of the vehicle. This torsional compliance may be found in the drive shaft between the transmission and the differential or the axle shaft between the differential and the driven wheels. It is often the case that independent design criteria encourages or requires this driveline to exhibit considerable torsional compliance. The existence of substantial torsional compliance in the driveline of the motor vehicle causes oscillatory response to clutch engagement. These oscillatory responses can cause considerable additional wear to the drive train components and other parts of the vehicle. In addition, these oscillatory responses can cause objectionable passenger compartment vibrations.

The oscillatory response of the driveline to clutch engagement is dependent in large degree on the manner in which the input speed of the transmission, i.e. the speed of the clutch, approaches the engine speed. A smooth approach of these speeds, such as via a decaying exponential function, imparts no torque transients on clutch lockup. If these speeds approach abruptly, then a torque transient is transmitted to the driveline resulting in an oscillatory response in the vehicle driveline. The following patents are assigned to the assignee of the present invention and represent prior developments which, in part, led to the present invention. U.S. Pat. No. 5,293,316 entitled "CLOSED LOOP LAUNCH AND CREEP CONTROL FOR AUTOMATIC CLUTCH" teaches the minimization or elimination of torsional oscillations due to compliance in the driveline during clutch engagement by controlling the clutch actuation to effect a smooth engagement. Subsequent patent applications, listed here, are improvements which make the control more robust. U.S. Pat. No. 5,275,267 entitled "CLOSED LOOP LAUNCH AND CREEP CONTROL FOR AUTOMATIC CLUTCH WITH ROBUST ALGORITHM" addresses the same problem and includes a prefilter to shape the system transient response and reduces the need for detailed particularization for individual vehicles or vehicle models. U.S. Pat. No. 5,403,249 entitled "METHOD AND APPARATUS FOR ROBUST AUTOMATIC CLUTCH CONTROL" is based on the same system and further improves robustness by overcoming the possibility of engine overload imposed by aggressive clutch engagement under certain conditions which leads to engine speed droop and even clutch dumping to avoid stalling the engine. The system as disclosed in the above specifications includes a slip integrator or actually two integrators in series which have the potential of being too sensitive to inner loop variations, leading to difficulty of control under some circumstances. Better control and increased robustness is provided by the improvement disclosed in U.S. Pat. No. 5,439,428 entitled "METHOD AND APPARATUS FOR ROBUST AUTOMATIC CLUTCH CONTROL WITH PID REGULATION."

The logic described in U.S. Pat. No. 5,378,211 entitled "CLUTCH MODE CONTROL LOGIC" determines whether the control is operating in a launch, creep, lockup or other mode. Both launch and creep require clutch slippage to control the torque transmission. In all the early developments represented by the above patents the systems have controlled clutch slippage in two distinctly separate modes and the change between creep and launch is evident to the operator.

This invention improves on the previous ones by providing a single slip mode to be used instead of the launch and creep modes. This is accomplished while increasing creep smoothness and responsiveness and low slippage of the clutch for low heat dissipation and long wear. This invention is based on that previous work and adds additional robustness. The robustness permits the mass manufacture of transmissions applicable to a wide range of heavy duty trucks without individual tuning for a given truck type or load range.

SUMMARY OF THE INVENTION

This invention is an automatic clutch controller used in a combination including a source of motive power, a friction clutch, and at least one inertially-loaded traction wheel connected to the friction clutch that has a torsional compliance exhibiting an oscillatory response to torque inputs. The automatic clutch controller is preferably used with a transmission shift controller. This automatic clutch controller provides smooth clutch engagement during vehicle startup to minimize the oscillatory response to clutch engagement. This automatic clutch controller is useful in large trucks.

The automatic clutch controller receives inputs from an engine speed sensor and a transmission input speed sensor. The transmission input speed sensor senses the rotational speed at the input to the transmission, which is the output of the friction clutch. The automatic clutch controller develops a clutch engagement signal controlling a clutch actuator between fully disengaged and fully engaged positions. The clutch engagement signal engages the friction clutch in a manner causing asymptotic approach of the transmission input speed to a reference speed. This minimizes the oscillatory response to torque inputs of the inertially-loaded traction wheel.

During launch or normal start of the vehicle, the transmission operates in a starting gear (1st or 2nd) and the control remains in a slip mode. The clutch engagement signal regulates clutch slippage to cause the transmission input speed to asymptotically approach the engine speed. When full clutch engagement is achieved and an upshift occurs, the control changes to lockup mode where sufficient clutch pressure is applied to prevent any possibility of clutch slip. The mode control logic prevents lockup mode until an upshift occurs, thereby avoiding mode shifting to and from lockup when in a starting gear. During a creeping operation, where throttle setting and engine speed are low, clutch slippage is used to control vehicle response to throttle position to allow low speed maneuvering. The slip mode controls this as well.

In the slip mode, a slip reference is derived as a function of throttle and engine speed. The slip reference is equal to engine speed at 0% throttle and gradually decreases to zero at 40% throttle. Transmission input speed is subtracted from engine speed to determine slip, and the slip is subtracted from the slip reference to determine slip error. That value is the input to an inner control loop patterned after that of U.S. Pat. No. 5,439,428 to generate a clutch engagement signal. The control loop has a compensator which is improved by including a third order notch filter with notch frequency placed in the range of expected vibration frequencies. This third order filter improves robustness and transportability between vehicles with both high and low driveline damping levels.

When increasing speed in the slip mode, good control is available, due to having the engine operating in a torque demand mode responsive to pedal demand. Increasing pedal demand is accompanied by higher engine torque and speed. The clutch slip is kept approximately constant for constant throttle. Higher vehicle speed is available for creeping by allowing higher engine speed but maintaining low slip.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
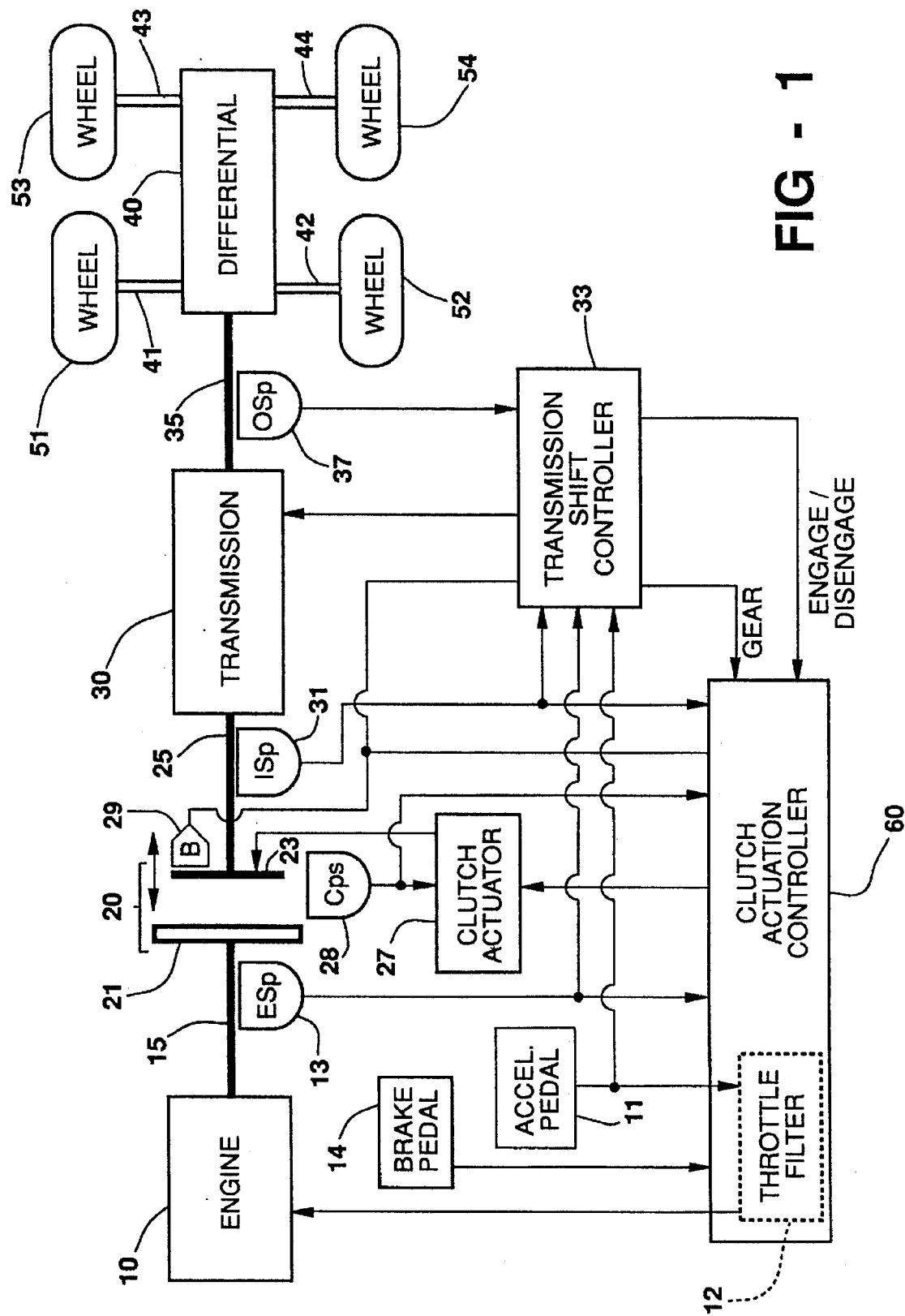
FIG. 1 is schematic diagram of a transmission driven through a clutch by an engine and clutch controller for carrying out the invention.

FIG. 1 illustrates in schematic form the drive train of a motor vehicle including the automatic clutch controller of the present invention. The motor vehicle includes engine 10 as a source of motive power. For a large truck of the type to which the present invention is most applicable, engine 10 would be a diesel internal combustion engine. An accelerator pedal 11 controls operation of engine 10 via throttle filter 12. Typically the torque control input to such an engine is a throttle for controlling air supply, although another control parameter such as fuel supply can be used instead. In any event, the throttle filter 12 is used to supply a torque control signal to the engine in response to the accelerator pedal 11. Throttle filter 12 is part of the clutch controller 60 and filters the throttle signal supplied to engine 10 by limiting the pedal 11 signal in some cases to a lower value. Engine 10 produces torque on engine shaft 15. Engine speed sensor 13 detects the rotational velocity of engine shaft 15. The actual site of rotational velocity detection by engine speed sensor may be at the engine flywheel. Engine speed sensor 13 is preferably a multi-tooth wheel whose tooth rotation is detected by a magnetic sensor.

Friction clutch 20 includes fixed plate 21 and movable plate 23 that are capable of full or partial engagement. Fixed plate 21 may be embodied by the engine flywheel. Friction clutch 20 couples torque from engine shaft 15 to transmission input shaft 25 corresponding to the degree of engagement between fixed plate 21 and movable plate 23. Note that while FIG. 1 illustrates only a single pair of fixed and movable plates, those skilled in the art would realize that clutch 20 could include multiple pairs of such plates.

Figure 2:
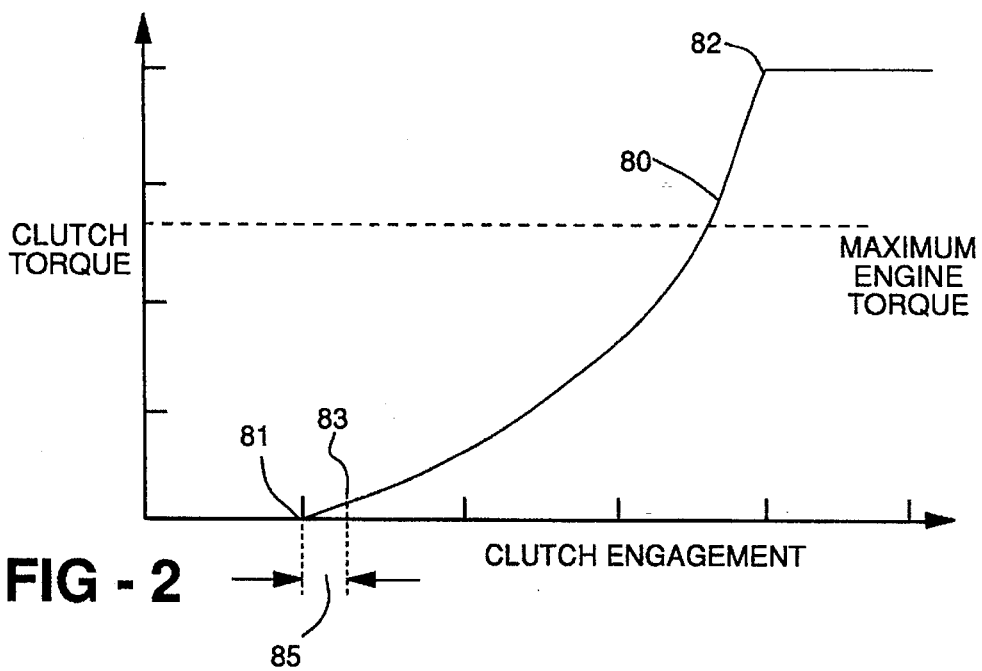
FIG. 2 is a curve of clutch torque as a function of clutch position.

A typical torque verses clutch position function is illustrated in FIG. 2. Clutch torque/position curve 80 is initially zero for a range of engagements before initial touch point 81. Clutch torque rises monotonically with increasing clutch engagement. In the example illustrated in FIG. 2, clutch torque rises slowly at first and then more steeply until the maximum clutch torque is reached upon full engagement at point 82. The typical clutch design calls for the maximum clutch torque upon full engagement to be about 1.5 times the maximum engine torque. This ensures that clutch 20 can transfer the maximum torque produced by engine 10 without slipping.

Clutch actuator 27 is coupled to movable plate 23 for control of clutch 20 from disengagement through partial engagement to full engagement. Clutch actuator 27 may be an electrical, hydraulic or pneumatic actuator and may be position or pressure controlled. Clutch actuator 27 controls the degree of clutch engagement according to a clutch engagement signal from clutch actuation controller 60. Clutch actuator 27 is a closed loop device that controls the degree of clutch engagement to cause the measured clutch position from clutch position sensor 28 to follow the clutch engagement signal. Touch point determination preferably employs the measured clutch position from clutch position sensor 28. Those skilled in the art would realize that clutch actuator 27 may be pressure controlled by a clutch actuation signal corresponding to the desired clutch pressure and employ clutch pressure feedback measured by a clutch pressure sensor.

Transmission input speed sensor 31 senses the rotational velocity of transmission input shaft 25, which is the input to transmission 30. Transmission 30 provides selectable drive ratios to drive shaft 35 under the control of transmission shift controller 33. Drive shaft 35 is coupled to differential 40. Transmission output speed sensor 37 senses the rotational velocity of drive shaft 35. Transmission input speed sensor 31 and transmission output speed sensor 37 are preferably constructed in the same manner as engine speed sensor 13. Where the motor vehicle is a large truck, differential 40 drives four axle shafts 41 to 44 that are in turn coupled to respective wheels 51 to 54.

Transmission shift controller 33 receives input signals from pedal 11, engine speed sensor 13, vehicle brake 14 pedal, transmission input speed sensor 31 and transmission output speed sensor 37. Transmission shift controller 33 generates gear select signals for control of transmission 30 and clutch engage/disengage signals coupled to clutch actuation controller 60. Transmission shift controller 33 preferably changes the final gear ratio provided by transmission 30 corresponding to the throttle setting, engine speed, transmission input speed and transmission output speed. Transmission shift controller 33 provides respective engage and disengage signals to clutch actuation controller 60 depending on whether friction clutch 20 should be engaged or disengaged. Transmission shift controller also transmits a gear signal to clutch actuation controller 60. This gear signal permits recall of the set of coefficients corresponding to the selected gear. Transmission shift controller 33 preferably briefly engages inertial brake 29 during upshifts. This slows the rotational speed of transmission input shaft 25 to match that of drive shaft 35 before engaging the higher gear. Touch point determination preferably employs inertial brake 29 in a manner that will be described below. The transmission shift controller 33 forms no part of the present invention and will not be further described.

Clutch actuation controller 60 provides a clutch engagement signal to clutch actuator 27 for controlling the position of movable plate 23. This controls the amount of torque transferred by clutch 20 according to clutch torque/position curve 80 of FIG. 2. Clutch actuation controller 60 operates under the control of transmission shift controller 33. Clutch actuation controller 60 controls the movement of moving plate 23 from disengagement to at least partial engagement or full engagement upon receipt of the engage signal from transmission shift controller 33. In the preferred embodiment it is contemplated that the clutch engagement signal will indicate a desired clutch position. Clutch actuator 27 preferably includes a closed loop control system employing the measured clutch position from clutch position sensor 28 for controlling movable plate 23 to this desired position. It is also feasible for the clutch engagement signal to represent a desired clutch pressure with clutch actuator 27 providing closed loop control to this desired pressure.

The control function of clutch actuation controller 60 is needed only for clutch positions between touch point 81 and full engagement. Clutch engagement less than that corresponding to touch point 81 provide no possibility of torque transfer because clutch 20 is fully disengaged. Upon receipt of the engage signal from transmission shift controller 33, clutch actuation controller 60 preferably rapidly advances clutch 20 to a point corresponding to touch point 81. This sets the zero of the clutch engagement control at touch point 81. Thereafter the clutch engagement is controlled by the control function of clutch actuation controller 60.

It is already known to determine the touch point of a clutch, either during operation or in advance. It is preferred to determine the touch point in advance by a test process which identifies the clutch position or a clutch pressure where the touch point occurs. The touch point process is fully disclosed in the U.S. Pat. No. 5,337,868 entitled "CLUTCH TOUTH POINT IDENTIFICATION," and U.S. Pat. No. 5,393,274 entitled "CLUTCH TOUCH POINT IDENTIFICATION ALGORITHM," which are assigned to the assignee of this invention and are incorporated herein by reference. This process is preferably a subset of the control function of clutch actuation controller 60.

Determination of the touch point involves putting transmission 30 in neutral and applying inertial brake 29. Inertial brake 29 is normally present to aid in matching the rotational speed of transmission input shaft 25 to that of drive shaft 35 during upshifts. Because clutch 20 is disengaged during the shift the amount of braking needed is very small. Inertial brake 29 need only develop a braking torque of about 5% of the idling engine torque. Clutch 20 is progressively engaged while engine 10 is idling until the transmission input speed reaches a predetermined fraction of the engine idle speed. This degree of clutch engagement, corresponding to point 83 of FIG. 2, transfers torque through clutch 20 to overcome the slight braking torque of inertial brake 29. A small, fixed offset 85 is subtracted from this degree of clutch engagement to determine the touch point 81.

Figure 3:
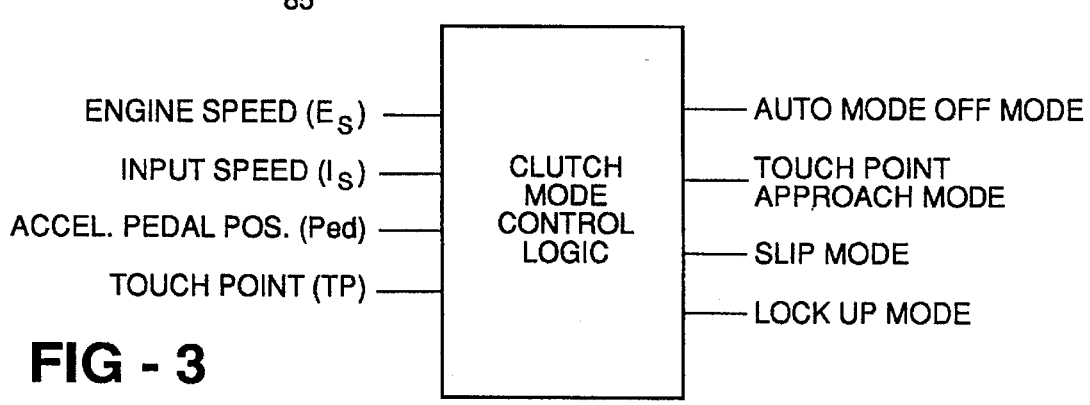
FIG. 3 is a diagram of a clutch control logic block showing the inputs and the outputs.

FIG. 3 is a diagram showing the inputs and outputs of clutch mode control logic which is a subset of the clutch actuation controller 60. The logic establishes modes according to engine and transmission operating conditions and is used in the control of clutch actuation, and is also used in the operation of the throttle filter. The inputs to the logic are signals representing engine speed ($E_s$) from sensor 13, input speed ($I_s$) from sensor 31, accelerator pedal position from pedal 11, and a touch point signal produced when the clutch position reaches the predetermined touch position. The logic output is one of four modes set forth below.

Touch Point Approach Mode

Here the clutch is commanded to go to the touch point. When leaving the Auto Mode Off state due to a pedal signal exceeding a minimum threshold, this mode is in a waiting state in which the clutch is beginning to close, but the touch point has not yet been attained. If the clutch had already been engaged, the degree of engagement will be reduced to the touch point. No engine control signal will be allowed in this mode.

Slip Mode

This mode is established when the touch point is attained, the pedal signal is above the minimum level (3%) and the transmission remains in a starting gear. During creeping with the pedal below a threshold value, say 40%, the clutch engagement is controlled to cause the input speed to smoothly approach a percentage of engine speed thereby causing the clutch to slip to allow slow vehicle maneuvers. For launch conditions with pedal position above the threshold, the clutch is controlled to engage at a rate dependent on the engine speed to smoothly advance the input speed to the engine speed.

Lockup Mode

This mode is entered from the slip mode when an upshift from a starting gear (1st or 2nd) has occurred. In this mode the clutch control signal fully engages the clutch. It is exited only when engine speed and pedal signal become low and/or when vehicle brakes are applied. This mode terminates the throttle filter function and the control signal will equal the pedal signal.

Auto Mode Off

One of the above four modes is active when the clutch controller is in an automatic mode. Auto Mode Off is active when there is no such automatic operation. Typically, the pedal signal will be at or near zero or the engine speed will be near idle. No control signal is output during this condition and the clutch is commanded to fully disengage.

Figure 4:
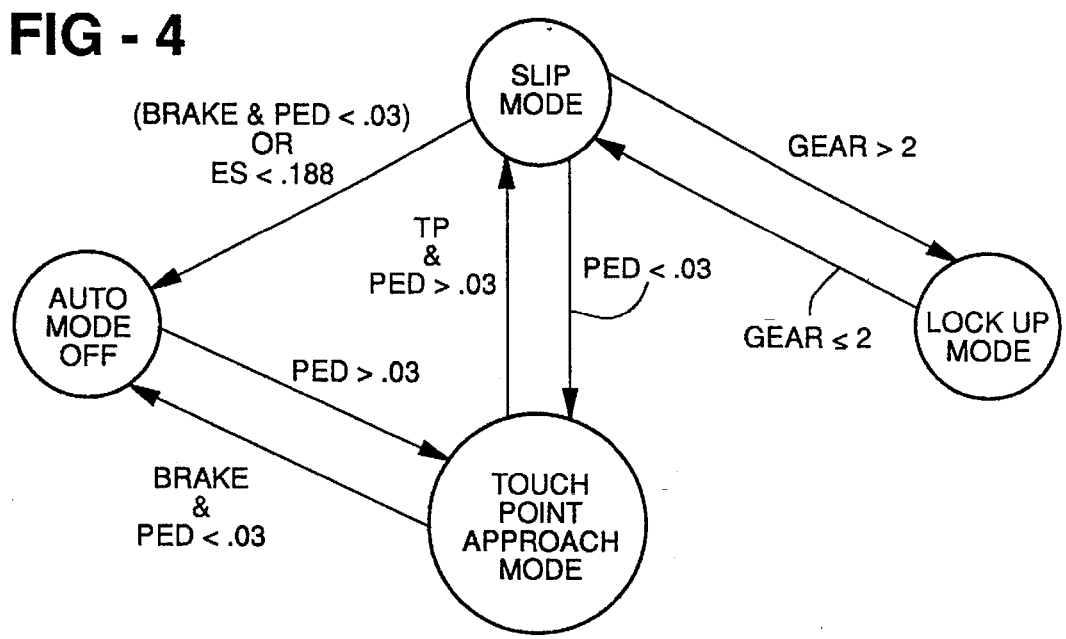
FIG. 4 is a bubble logic diagram for the clutch control logic of FIG. 3.

A bubble diagram in FIG. 4 illustrates the clutch mode control logic. Specific numbers are given in the diagram as an example applicable to a particular engine/transmission combination. Other numbers are appropriate in other applications. Each number refers to the decimal fraction of full scale or maximum value of the parameter indicated. For example, engine idle speed is 25% or 0.25; the value 0.27 is chosen to represent a certain speed above idle, and an engine speed less than 0.188 is approaching a stall condition. Also, to be sure that a low throttle signal is intentional, it is required that the system shall treat any pedal value less then 3% or 0.03 as a zero signal.

The diagram of FIG. 4 is entered in the Auto Mode Off condition. When the pedal signal exceeds 0.03, the Touch Point Approach Mode is activated. When at Touch Point Approach Mode, if the pedal signal drops below 0.03 and the brake is applied, the mode returns to Auto Mode Off. From Touch Point Approach no action occurs until the touch point TP occurs and the pedal signal is greater than 3%, and then Slip Mode is activated. If the pedal signal drops below 3% it returns to Touch Point Approach Mode. If the engine speed nears stall or the brake is applied and the pedal signal is below 0.03, the logic returns to Auto Mode Off. In the case of a successful clutch engagement, if the transmission has shifted to 2nd gear or higher the Lockup Mode is entered. The controller will remain in Lockup Mode unless the transmission returns to 1st or 2nd gear; then it will return to Slip Mode. If the brake signal is present in addition to pedal release and engine speed drop below its "above idle" point, the controller will go to Auto Mode Off.

Figure 5:
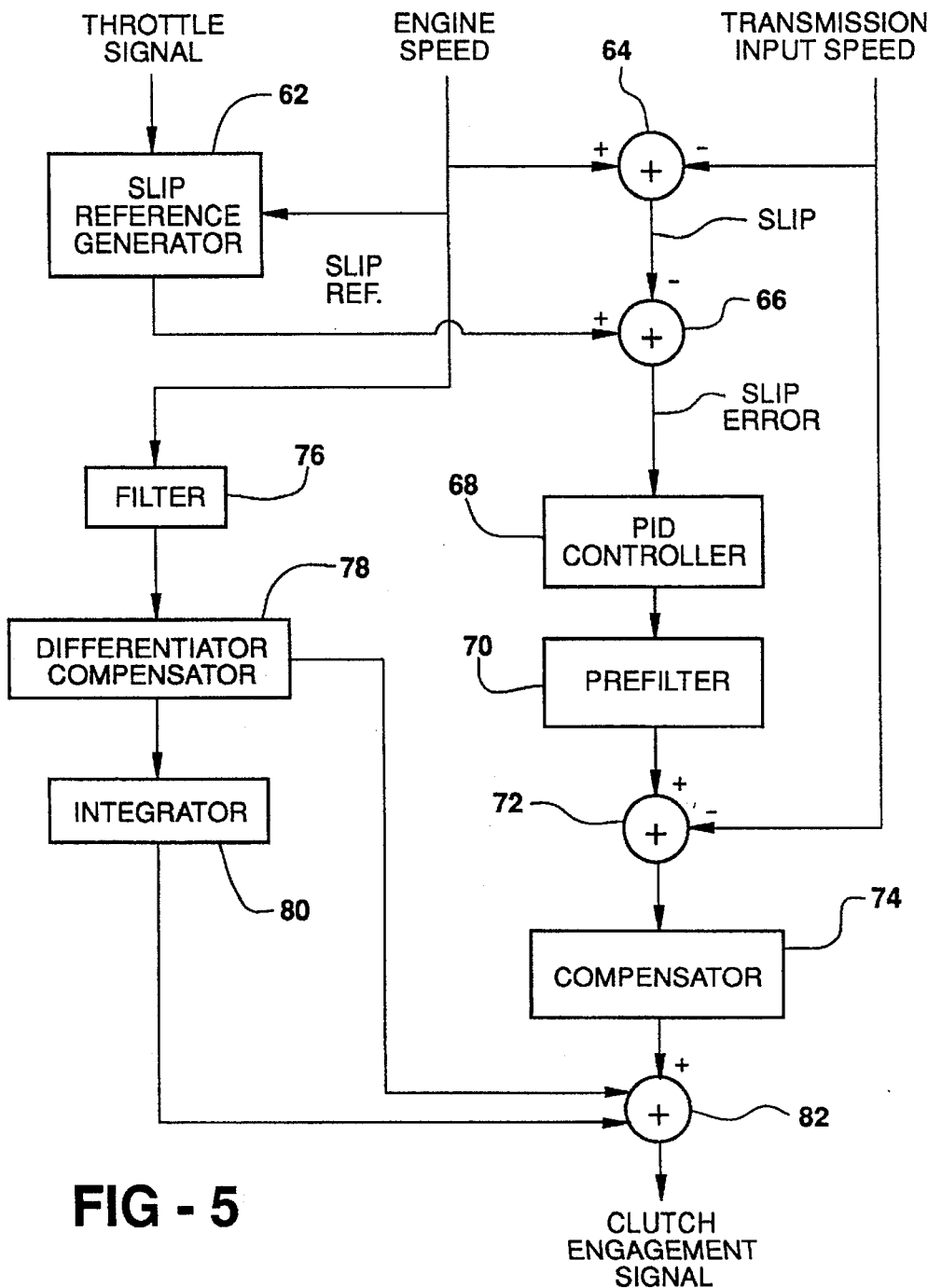
FIG. 5 illustrates the function of an automatic clutch controller shown as a block diagram, according to the invention.

FIG. 5 illustrates schematically the control function of clutch actuation controller 60. As also illustrated in FIG. 1, clutch actuation controller 60 receives the throttle signal from throttle 11, the engine speed signal from engine speed sensor 13 and the transmission input speed signal from transmission input speed sensor 31. Clutch actuation controller 60 illustrated in FIG. 5 generates a clutch engagement signal that is supplied to clutch actuator 27 for operation of the friction clutch 20. The degree of clutch actuation, together with the throttle setting, the engine speed and the vehicle characteristics determine the transmission input speed that is sensed by transmission input speed sensor 31 and supplied to clutch actuation controller 60. Therefore, the control schematic illustrated in FIG. 5 is a closed loop system.

Clutch actuation controller 60 is preferably realized via a microcontroller circuit. Inputs corresponding to the engine speed, the transmission input speed and the throttle setting must be in digital form. These input signals are preferably sampled at a rate consistent with the rate of operation of the microcontroller and fast enough to provide the desired control. As previously described, the engine speed, transmission input speed and transmission output speed are preferably detected via multi-tooth wheels whose teeth rotation is detected by magnetic sensors. The pulse trains detected by the magnetic sensors are counted during predetermined intervals. The respective counts are directly proportional to the measured speed. For proper control the sign of the transmission input speed signal must be negative if the vehicle is moving backwards. Some manner of detecting the direction of rotation of input shaft 25 is needed. Such direction sensing is conventional and will not be further described. The throttle setting is preferably detected via an analog sensor such as a potentiometer. This analog throttle signal is digitized via an analog-to-digital converter for use by the microcontroller. The microcontroller executes the processes illustrated in FIG. 5 by discrete difference equations in a manner known in the art. The control processes illustrated in FIG. 5 should therefore be regarded as an indication of how to program the microcontroller embodying the invention rather than discrete hardware. It is feasible for the same microcontroller, if of sufficient capacity and properly programmed, to act as both clutch actuation controller 60 and as transmission shift controller 33. It is believed that an Intel 80C196 microcontroller has sufficient computation capacity to serve in this manner.

Figure 6:
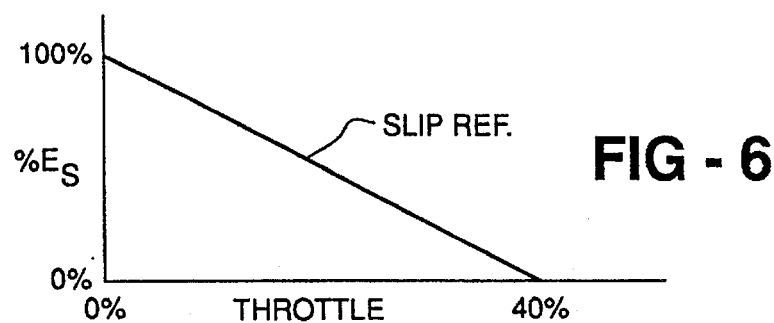
FIG. 6 is a graph illustrating a slip reference function employed by the FIG. 5 diagram, according to the invention.

A slip reference generator 62 receives the throttle signal and produces a slip reference signal according to the function illustrated in FIG. 6 wherein the signal equals 100% of the engine speed $E_s$ at 0% throttle and gradually decreases to zero percent engine speed at 40% throttle. A linear decrease has been found to be suitable although other functions could be used. Thus the slip reference is a function of both engine speed and the throttle position. Input speed is subtracted from the engine speed at an algebraic summer 64 to produce a slip signal, and the slip signal is subtracted from the slip reference signal at an algebraic summer 66 to determine a slip error signal. The remainder of the control is like that of U.S. Pat. No. 5,439,428, which is referred to above and incorporated herein by reference. The slip error is fed to a PID (proportional-integral-differential) regulator 68; such regulators are well known in control methodology and may take different forms. In this application, a PI regulator may be used instead, eliminating the differential term. The output of the PID regulator is fed to a prefilter 70. An algebraic summer 72 forms the difference between the prefilter output and the input speed. This difference is supplied to the compensator 74. The compensator 74 includes an approximate inverse model of the torsional oscillatory response of the vehicle to torque inputs and comprises a third order notch filter. Compensator 74 includes a gain versus frequency function selected to reduce variations in the closed loop response of clutch actuation controller 60 due to variations in the transfer function of the vehicle driveline and in particular has increased gain at low frequencies to increase the robustness of the system.

A feedforward signal is provided in the clutch engagement signal via an engine speed differential signal. Differentiator compensator or acceleration compensator 78 forms a differential signal responsive to the rate of change in the engine speed but is filtered by low pass filter 76 to prevent abrupt decrease due to small engine deceleration. This engine speed differential signal and its integral formed by integrator 80 are supplied to algebraic summer 82. Algebraic summer 82 sums the output of compensator 74, the engine speed differential signal from acceleration compensator 76 and the integral signal from integrator 80 to form the clutch engagement signal. Clutch actuator 27 employs this clutch engagement signal to control the degree of clutch engagement.

The feedforward signal permits better response of clutch actuation controller 60 when the engine speed is accelerating. Under conditions of engine speed acceleration the feedforward signal causes rapid engagement of clutch 20 proportional to the rate of engine acceleration. The engine speed can increase rapidly under full throttle conditions before the driveline torque is established. This is because the speed of response of clutch actuation controller 60 without this feedforward response is low compared with the peak engine speed of response. With this feedforward response rapid engine acceleration results in more rapid than otherwise clutch engagement. The additional clutch engagement tends to restrain increase in engine speed by requiring additional torque from the engine. When the engine speed reaches a constant value, the differential term decays to zero and integrator 80 retains the clutch engagement needed to restrain engine speed. Other portions of the control function then serve to provide asymptotic convergence of the transmission input speed to the reference speed.

The improved control algorithm affords all the advantages of that disclosed in U.S. Pat. No. 5,439,428 as well as several additional advantages. The slip reference signal allows substantial clutch slip at very low throttle position but aggressively decreases the slip as the throttle value increases. The net result is not only very smooth operation but also the net slip is decreased, resulting in better clutch wear and lower heat dissipation. It has been found that the algorithm change is successful in different types of heavy trucks so that it is quite transportable. The third order filter used instead of a second order filter in the compensator is effective to remove driveline vibrations also improves robustness as well as transportability between vehicles of both high and low driveline damping levels. This improved clutch control is especially well suited for use with a freeze logic feature as disclosed in U.S. Pat. No. 5,403,249.

The change in mode logic from prior systems to eliminate lockup prior to an upshift avoids the undesirable effects of going into lockup while creeping. Thus the system stays in slip mode at high throttle. A zero slip condition may exist in this slip mode. Thus slipping may resume, e.g., due to load increase, but the resumption of shift is not felt by the driver. It should be noted that below 40% throttle when the slip reference signal is produced, the reference value for the control is the slip reference; however when the slip reference is zero above 40% throttle, the engine speed becomes the control reference as in previous systems which required a separate startup or launch mode.

The embodiments of the invention in which an exclusive property or privilege is claimed are defined as follows:

1. An automatic clutch control in a power train including an engine controlled by a throttle, a friction clutch having an input shaft connected to the engine and an output shaft connected to the input of a transmission, a throttle position sensor for producing a throttle signal, an engine speed sensor connected to the engine for generating an engine speed signal, a transmission input speed sensor connected to the output shaft of the friction clutch for generating a transmission input speed signal corresponding to the rotational speed of the output shaft of the friction clutch, a clutch actuator connected to the friction clutch for controlling engagement of the friction clutch from disengaged to fully engaged according to a clutch engagement signal, the control comprising:

a slip reference generator responsive to the throttle signal for producing a slip reference signal which is a function of throttle and engine speed;

a circuit for producing a slip error signal from the input speed, the engine speed, and the slip reference signals;

a PID (proportional-integral-differential) regulator responsive to the slip error signal to regulate the slip error; and a control circuit responsive to the regulated slip error for generating a clutch engagement signal to minimize the slip error signal, whereby the slip is controlled according to the slip reference signal.

2. The invention as defined in claim 1 wherein the slip reference generator produces a slip reference signal which is a percentage of engine speed, the percentage decreasing with increasing throttle.

3. The invention as defined in claim 1 wherein the slip reference generator produces a slip reference signal which is 100% engine speed at 0% throttle and gradually diminishes to 0% engine speed at a determined throttle setting.

4. The invention as defined in claim 1 wherein the circuit for producing a slip error signal comprises a first algebraic summer for determining a slip signal from the difference of the engine speed signal and the input speed signal and a second algebraic summer for determining the slip error signal from the difference of the slip reference and the slip signals.

5. The invention as defined in claim 1 wherein the control circuit includes a compensator having a third order notch filter.

6. The invention as defined in claim 1 wherein the control includes a mode logic circuit defining:

an auto off mode for disabling the automatic control when throttle is substantially closed;

a touch point control mode for controlling the clutch to a touch point when the throttle is above a minimum setting;

a slip mode entered when the touch point is attained for actuating the automatic control circuit to control clutch slippage according to the throttle and engine speed signals; and a lockup mode entered when an upshift occurs.

7. The invention as defined in claim 1 wherein the control circuit includes:

a compensator responsive to the regulated slip error to produce a compensated signal;

a feed forward circuit; and means for summing the compensated signal and the feed forward output to produce the clutch engagement signal.

8. The invention as defined in claim 7 wherein the feedforward circuit includes;

a differentiating compensator responsive to the engine speed for producing a lead signal; and an integrator responsive to the lead signal for producing an integrator signal, whereby the lead signal and the integrator signal comprise the feedforward output.

9. A method of automatic clutch control in a vehicle having a gear transmission including an input shaft driven through a friction clutch by an engine that is controlled by a throttle, and having a clutch actuation controller for actuating the friction clutch, wherein the friction clutch has engageable parts which initially touch and then progressively increase in torque transfer during actuation, the clutch actuation controller having automatic modes including slip mode and lockup mode, the method comprising the steps of:

measuring engine speed, transmission input speed, and throttle position and producing corresponding signals;

generating a slip reference signal as a function of engine speed and throttle signals;

determining a slip value by comparing the engine speed and the input speed;

determining slip error by comparing the slip reference and the slip value; and controlling the clutch actuation to minimize the slip error.

10. The invention as defined in claim 9 wherein the slip reference signal comprises engine speed at zero throttle position and a gradually decreasing percentage of engine speed at greater throttle values to attain zero percentage at an intermediate throttle value.

11. The invention as defined in claim 9 wherein the slip reference signal comprises engine speed at zero throttle position and a gradually decreasing percentage of engine speed at greater throttle values to attain zero percentage at an intermediate throttle value; and when the slip reference is zero, controlling the clutch actuation in accordance with the engine speed.

12. The invention as defined in claim 9 wherein the step of controlling the clutch actuation comprises:

modifying the slip error by proportional and integral regulation of the slip error signal;

and generating a clutch engagement signal to minimize the slip error signal by modifying the difference of the input speed signal and the slip error signal.

13. The invention as defined in claim 9 wherein the step of controlling the clutch actuation comprises:

modifying the slip error by proportional and integral regulation of the slip error signal;

third order filtering the difference of the input speed signal and the slip error signal to produce a compensated signal;

differentiating the engine speed to produce a differential signal;

integrating the differential signal to produce an integrated signal; and summing the compensated signal, the differential signal and the integrated signal to produce a clutch actuation signal.

14. The invention as defined in claim 9 wherein the step of controlling the clutch actuation comprises:

modifying the slip error by proportional and integral regulation of the slip error signal;

summing the input speed signal and the modified slip error signal; and filtering the summed signals by a third order notch filter with notch frequency placed in the range of expected vibration frequencies.

15. The invention as defined in claim 9 including:

entering the slip mode after attaining touch point; and exiting the slip mode and entering the lockup mode when a gear upshift occurs;

whereby the step of controlling the clutch actuation to minimize the slip error occurs only when in the slip mode.

\* \* \* \* \*